(12) United States Patent
Aoike

(10) Patent No.: US 8,487,878 B2
(45) Date of Patent: Jul. 16, 2013

(54) TERMINAL APPARATUS, BACKLIGHT EMISSION METHOD AND COMPUTER READABLE MEDIUM FOR TERMINAL APPARATUS

(75) Inventor: Toru Aoike, Tokyo (JP)

(73) Assignee: NEC Corporation, Tokyo (JP)

( * ) Notice: Subject to any disclaimer, the term of this patent is extended or adjusted under 35 U.S.C. 154(b) by 187 days.

(21) Appl. No.: 13/056,047

(22) PCT Filed: Jul. 23, 2009

(86) PCT No.: PCT/JP2009/063219
§ 371 (c)(1),
(2), (4) Date: Jan. 26, 2000

(87) PCT Pub. No.: WO2010/018740
PCT Pub. Date: Feb. 18, 2010

(65) Prior Publication Data
US 2011/0128233 A1    Jun. 2, 2011

(30) Foreign Application Priority Data

Aug. 12, 2008 (JP) ................................. 2008-207854

(51) Int. Cl.
*G06F 3/02* (2006.01)
(52) U.S. Cl.
USPC ............................................. 345/170; 345/90
(58) Field of Classification Search
USPC ............ 345/76, 82–84, 87, 88, 90, 102, 156, 345/168–170, 172; 349/61
See application file for complete search history.

(56) References Cited

U.S. PATENT DOCUMENTS

| | | | |
|---|---|---|---|
| 6,762,740 B1 * | 7/2004 | Kimura | 345/102 |
| 7,388,590 B2 * | 6/2008 | O'Neil et al. | 345/589 |
| 8,167,458 B2 * | 5/2012 | Wingett | 362/293 |
| 2004/0022047 A1 * | 2/2004 | Okayasu | 362/23 |
| 2006/0164724 A1 * | 7/2006 | Nagata et al. | 359/399 |
| 2007/0142093 A1 * | 6/2007 | Mikuni et al. | 455/566 |
| 2007/0296701 A1 * | 12/2007 | Pope et al. | 345/168 |
| 2009/0135142 A1 * | 5/2009 | Fu et al. | 345/168 |
| 2009/0261739 A1 * | 10/2009 | Yang | 315/158 |
| 2011/0122069 A1 * | 5/2011 | Asakura et al. | 345/169 |
| 2011/0128166 A1 * | 6/2011 | Kagami | 341/22 |

FOREIGN PATENT DOCUMENTS

| | | |
|---|---|---|
| CN | 1571438 A | 1/2005 |
| CN | 1787709 A | 6/2006 |
| CN | 101174181 A | 5/2008 |
| CN | 101193144 A | 6/2008 |

(Continued)

OTHER PUBLICATIONS

International Search Report for PCT/JP2009/063219 mailed Sep. 1, 2009.

(Continued)

*Primary Examiner* — Joe H Cheng

(57) ABSTRACT

The terminal apparatus includes input keys configured to detect pressing conducted thereon respectively, key backlights each of which emits a plurality of colors of light to shine corresponding one of the input keys, and a backlight controller configured to control the plurality of colors of light independently for each of the key backlights. The backlight controller causes the key backlights to emit light of a first color in a case where an input key out of the input keys detects pressing thereon, and changes an emission color of a key backlight corresponding to the input key detecting the pressing from the first color to a second color when a state of the pressing becomes a predetermined state.

15 Claims, 3 Drawing Sheets

FOREIGN PATENT DOCUMENTS

| | | |
|---|---|---|
| JP | 2001217904 A | 8/2001 |
| JP | 2005134998 A | 5/2005 |
| JP | 2006227187 A | 8/2006 |
| JP | 2006322728 A | 11/2006 |
| JP | 2007041757 A | 2/2007 |
| JP | 2007151005 A | 6/2007 |
| JP | 2007-228280 A | 9/2007 |
| WO | 2005/125159 A1 | 12/2005 |

OTHER PUBLICATIONS

Chinese Office Action for CN200980130939.7 dated May 11, 2012.

* cited by examiner

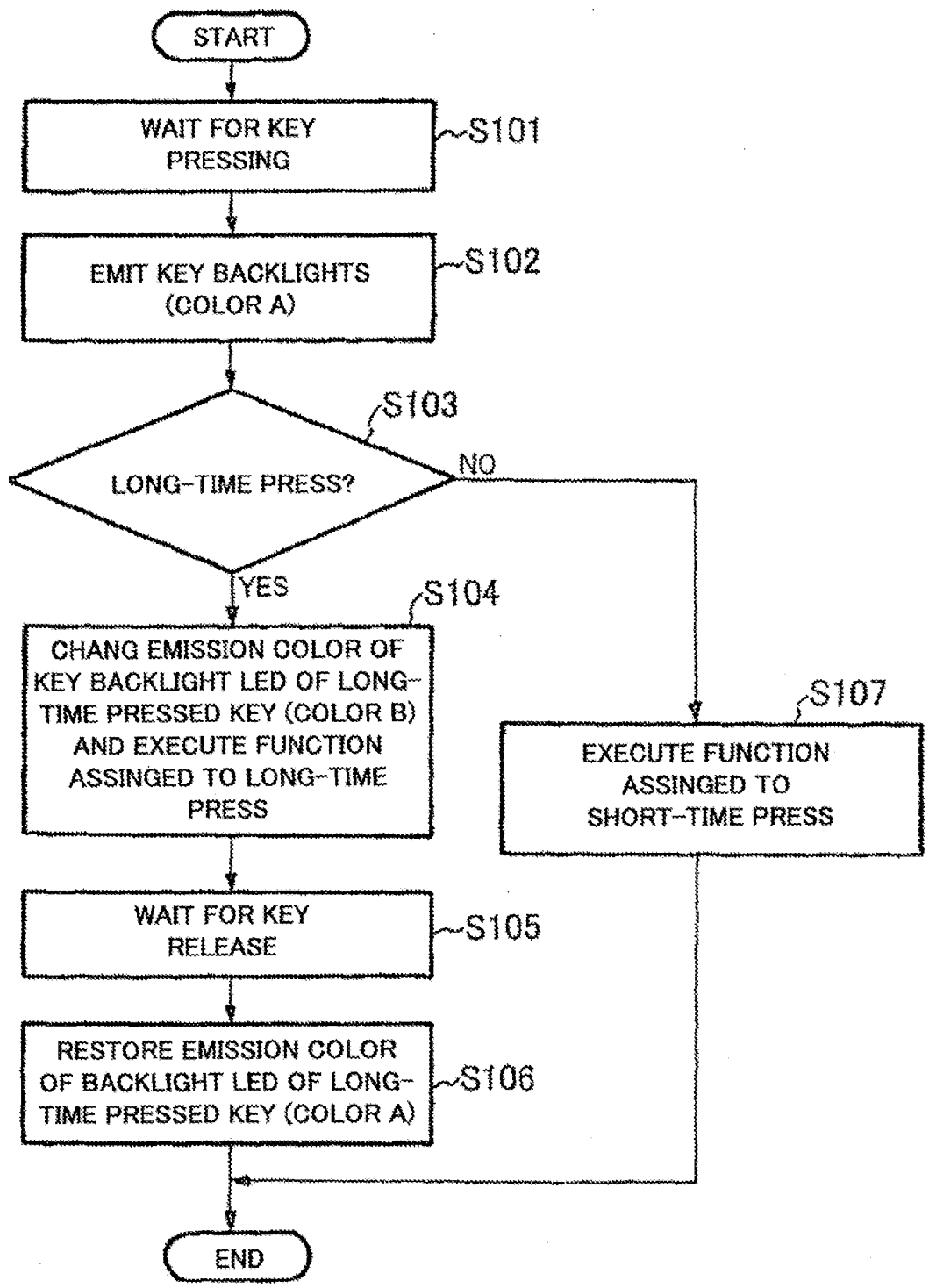

TERMINAL APPARATUS, BACKLIGHT EMISSION METHOD AND COMPUTER READABLE MEDIUM FOR TERMINAL APPARATUS

TECHNICAL FIELD

The present invention relates to a terminal apparatus, and backlight emission method and computer readable medium for the terminal apparatus.

BACKGROUND ART

In general, a user uses an input key to manipulate a mobile terminal apparatus such as a mobile phone, a personal handy phone system (PHS) terminal, a personal digital assistant (PDA), and a digital audio player (DAP). For example, usage of a mobile phone provided with a key backlight, which shines key input unit, is becoming more common considering manipulation carried out in the darkness.

Providing the key backlight for manipulation using the input key is especially important for the mobile terminal apparatus having down sized keys.

As a relating technique, PL 1 discloses a technique that causes an operation key unit to function as unconventional notifying means by making the operation key unit in a main body to emit or blink light in various manners or various colors according to phone operations of the mobile phone.

PL 2 discloses a technique that causes keys in an operation unit to emit different colors of light to improve efficiency for key discrimination and key manipulation based on the emission colors at the time of the key backlight emission.

As above, regarding the key backlight which emits the light on the key input unit of the mobile phone terminal, the usage of the techniques causing the key backlight to emit light can help key input by the user and enhance the usability.

{Citation List}
{Patent Literature}
{PL 1} JP-A-2001-217904
{PL 2} JP-A-2005-134998

SUMMARY OF INVENTION

{Technical Problem}

In general, key operations carried out on the mobile terminal apparatus, such as a mobile phone, include a normal operation of pressing a key briefly (hereinafter this operation is referred to as "short-time press") and a long-time pressing operation (hereinafter this operation is referred to as "long-time press"), that is, pressing a key longer (e.g., pressing for 2 seconds). In view of this point, how long period of pressing the long-time press requires may not be explicit. A period of time required for detecting the long-time press may vary depending on functions, and the user may be confused.

However, in the above described techniques, the key backlight which shines the light on the key input unit can be utilized to determine whether the short-time press is conducted but not to determine whether the ling-time press is conducted.

It is thus an exemplary object of the present invention is to provide a terminal apparatus and back light emission method and computer readable medium for the terminal apparatus, which helps key input using the key backlight of the terminal apparatus.

{Solution to Problem}

According to a first aspect of the invention, there is provided a terminal apparatus comprising input keys configured to detect pressing conducted thereon respectively, key backlights each of which emits a plurality of colors of light to shine corresponding one of the input keys, and a backlight controller configured to control the plurality of colors of light independently for each of the key backlights, wherein the backlight controller causes the key backlights to emit light of a first color in a case where an input key out of the input keys detects pressing thereon, and changes an emission color of a key backlight corresponding to the input key detecting the pressing from the first color to a second color when a state of the pressing becomes a predetermined state.

According to a second aspect of the invention, there is provided a backlight emission method for a terminal apparatus comprising input keys configured to detect pressing conducted thereon respectively, key backlights each of which emits a plurality of colors of light to shine corresponding one of the input keys, and a backlight controller configured to control the plurality of colors of light independently for each of the key backlights, the method comprising causing the key backlights to emit light of a first color in a case where an input key out of the input keys detects pressing thereon, and changing an emission color of a key backlight corresponding to the input key detecting the pressing from the first color to a second color when a state of the pressing becomes a predetermined state.

According to a third aspect of the invention, there is provided a computer readable medium having stored thereon a program which, when executed by a computer, causes a computer to function as a terminal apparatus, the terminal apparatus comprising input keys configured to detect pressing conducted thereon respectively, key backlights each of which emits a plurality of colors of light to shine corresponding one of the input keys, and a backlight controller configured to control the plurality of colors of light independently for each of the key backlights, wherein the backlight controller causes the key backlights to emit light of a first color in a case where an input key out of the input keys detects pressing thereon, and changes an emission color of a key backlight corresponding to the input key detecting the pressing from the first color to a second color when a state of the pressing becomes a predetermined state.

{Advantageous Effects of Invention}

According to the present invention, the operability of the terminal apparatus can be improved because the key input can be helped using the key backlight of the terminal apparatus.

BRIEF DESCRIPTION OF DRAWINGS

FIG. 4 is a flowchart showing basic operation according to the embodiment of the invention.

DESCRIPTION OF EMBODIMENTS

Hereinafter, an exemplary embodiment of the present invention will be described in detail with reference to the accompanying drawings.

Figure 1:
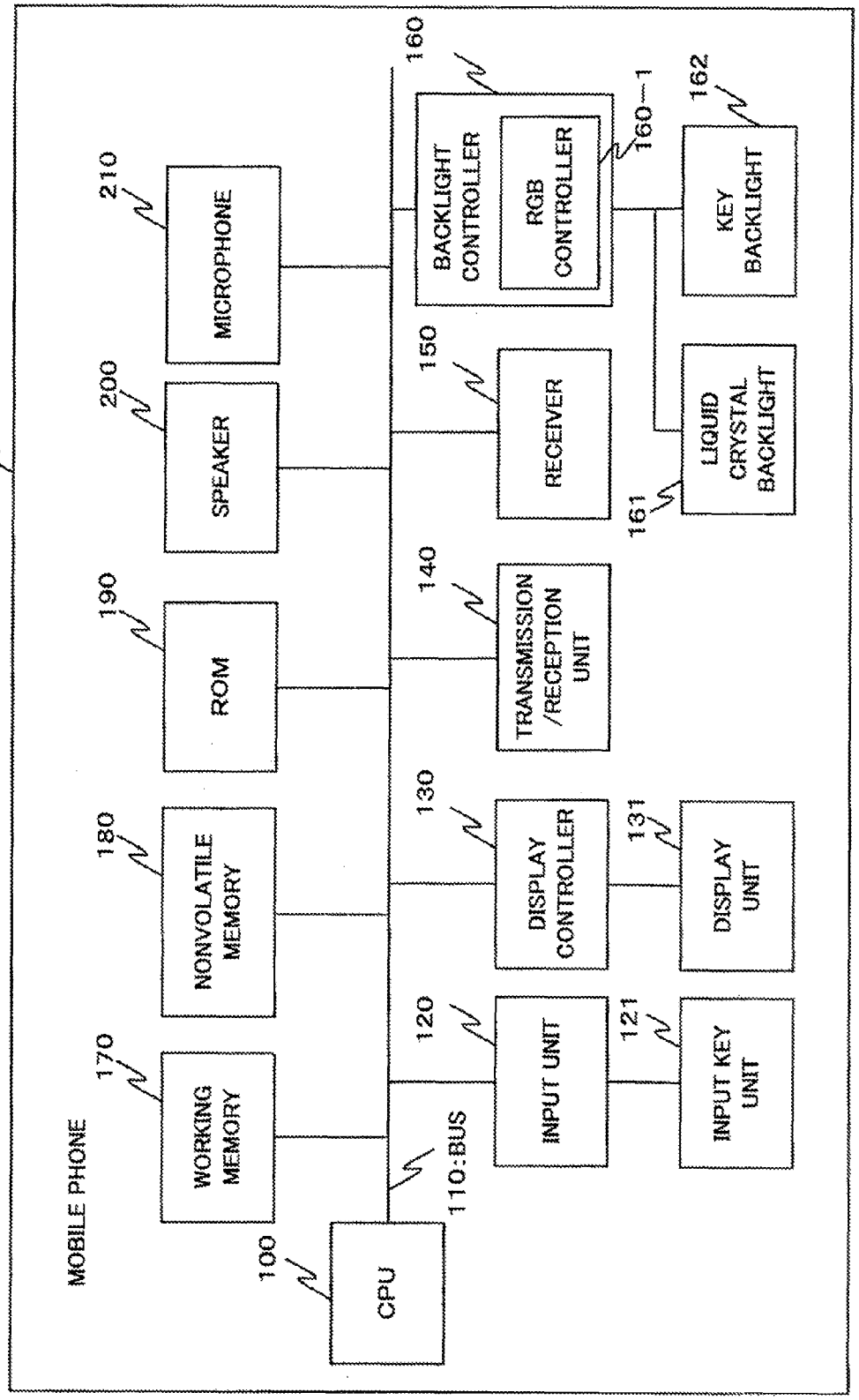
FIG. 1 is a view showing a basic configuration according to an embodiment of the invention.

FIG. 1 shows an example of a circuitry configuration of a mobile phone 1000 which represents an exemplary embodiment of the present invention.

The mobile phone 1000 according to the present embodiment includes a CPU 100, a bus 110, an input unit 120, an input key unit 121, a display controller 130, a display unit 131, a transmission/reception unit 140, a receiver 150, a backlight controller 160, a liquid crystal backlight 161, a key backlight 162, a working memory 170, a nonvolatile memory 180, a read only memory (ROM) 190, a speaker 200, and a microphone 210.

The CPU (central processing unit) 100 is an element which executes operational processing and connected with other components of the apparatus via the bus 110. The input unit 120 includes a circuit which detects key input from the input key unit 121. A combination of the input unit 120 and the input key unit 121 may function as "input keys" of the invention.

Figure 2:
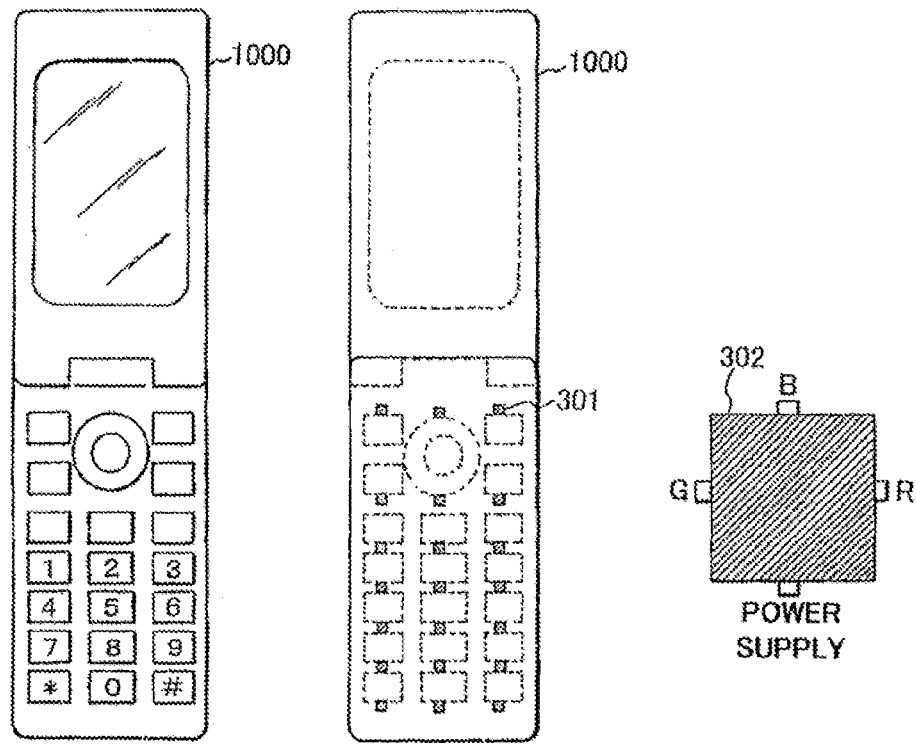
FIG. 2 is a view showing an example of installation of a key backlight LED 301 and a basic configuration of a light 302 according to the embodiment of the invention.

The display controller 130 includes a control circuit which controls display on the display unit 131. The display unit 131 includes a display device which provides user with information, is installed at the front of the main body of the apparatus as shown in FIG. 2 for example, and may be a display device such as a black and white or color liquid crystal panel or an organic EL (Electro-Luminescence) electronic fluorescent display.

The transmission/reception unit 140 includes a portion for transmitting and receiving audio signal and data, and includes a circuit to execute transmission, calling, and communication wirelessly.

The receiver 150 includes a device to output sound of a calling party when conducting a call or the like.

The working memory 170 includes a storage device to store data which is temporarily required for the CPU 100 to execute a program. As the working memory 170, for example, a random access memory (RAM) may be employed.

The nonvolatile memory 180 includes a semiconductor memory on which data writing and erasing are arbitrarily possible and the contents are not erased if the power is off. Phonebook data, various setting values and user data can also be stored therein.

The ROM (read only memory) 190 includes a memory which stores stable data such as a variety of controlling programs to be executed by the CPU 100.

The speaker 200 includes a device to output ringtone, voice sound, beep sound and the like.

The microphone 210 includes a device to convert audio sound into an electrical signal for audio transmission.

The backlight controller 160 includes a circuit to control the liquid crystal backlight 161 and the key backlight 162. In the present embodiment. The backlight controller 160 includes an RGB controller 160-1.

In addition, the key backlight 162 includes a lighting device such as a light emitting diode (LED) or the like, and includes respective three lighting elements of R, G and B.

FIG. 2 shows an example of installation position of the key backlight 162. In the present embodiment, it is assumed that the key backlight 162 includes an LED-using light, which, hereinafter and in the drawings, is to be referred to as key backlight LED 301.

In FIG. 2, a light 302 used in the key backlight LED 301 includes a tricolor LED.

The light 302 includes three lighting elements of R, G, and B for example, and connected to the RGB controller 160-1.

The RGB controller 160-1 controls brightness and emission times of the lighting elements of R, G, and B. It is possible that the user arbitrarily sets certain emission and extinction patterns.

The key backlight LED 301 is installed under every or an arbitrary key of the mobile phone 1000, or installed nearby. In the figure, such an example is shown that a plurality of the key backlight LEDs 301 are positioned horizontally in three rows and vertically in seven columns. The respective 21 key backlight LEDs 301 can be independently controlled by the backlight controller 160.

Figure 3:
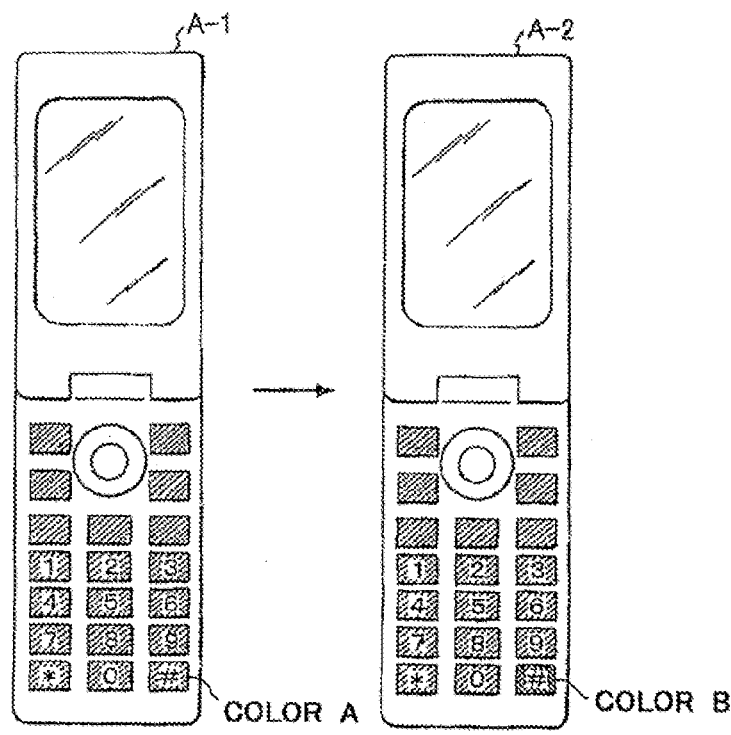
FIG. 3 is a view showing state transition of the key backlight LED 301 according to the embodiment of the invention.

FIG. 3 shows a change of emission color of an LED which is positioned directly under "#" key. In the left portion of the figure, A-1 shows a state before the change of emission color, and A-2 in the right portion of the figure shows a state after the change of the emission color of the LED directly under "#" key. Referring to FIG. 3, it can be understood that only the emission color of the LED 301, which is positioned directly under "#" key, is changed from a color A to a color B.

Next, operation of the present embodiment will be described. Throughout the description, it is assumed by way of example that when "#" key is pressed in the long-time press manner, a manner mode is started.

FIG. 4 shows a flowchart expressing a procedure of processing according to the present embodiment. To be specific, such procedure is shown that in the case where a key backlight emits light in response to key pressing (i.e., light is once emitted in the state in which the short-time press is conducted), when the key pressing is determined to be the long-time press, the color of light from the key backlight is changed, and when the key is released, the color of light returns to the original color.

First, the mobile phone 1000 is set in a waiting state for pressing of the input key unit 121 (step S101).

Subsequently, when "#" key, which is an exemplary key in the input key unit 121 to be pressed under the state of step S101, is pressed, the input unit 120 detects key input. Then, in response, every key backlight LED 301 emits light of color A under the control of the backlight controller 160 (step S102).

What color the emission color A is may be set by the user or the setting may be settled at default. The state in which every key backlight LED 301 emits light of color A in step S102 is shown as the state of A-1 in FIG. 3.

Next, it is determined whether the key input is the long-time press or not based on the key input detected by the input unit 120 (step S103).

When the long-time press is detected (Yes in step S103), the color of a key backlight LED 301 corresponding to a key which is under the long-time press is changed from color A to color B under the control of the backlight controller 160. Similarly to the color A, the emission color B may be set by the user or may be fixed. Then, at the time, the CPU 100 executes "transition to the manner mode," which is assigned to the long-time press of "#" key (step S104). This state is shown as the state A-2 in FIG. 3.

Next, the mobile phone 1000 gets into a waiting state for key release (step S105). After the waiting state for key release of step S105 is set, when the input key unit 121 being pressed is released, the emission color of the key back light LED 301 being changed into the color B in step S104, is returned to the original color i.e., color A under the control of the backlight controller 160. This state is shown as the state of A-1 in FIG. 3.

On the other hand, when the key pressing is not determined as the long-time press (No in step S103) the CPU 100 executes a function which is assigned to the short-time press. For example, when "a" key is pressed in the short-time press manner, processing is executed under the condition that dialing input for "#" key is conducted (step S107).

As described above, when the long-time press is detected, emission color of a corresponding key backlight LED is changed, and it is easy for user to see that the long-time press is conducted, so that the usability can be enhanced according to the present embodiment.

In addition, such an advantage can be realized that more entertaining mobile terminal apparatus in which a key coloring is changed depending on key operation can be provided.

The components of the embodiment can be variously changed or altered. Hereinafter, some examples of the changing and altering will be shown. Only examples of the embodiment will be described below, and it will be understood for a person skilled in the art to make other changing or altering than the description below within the technical scope of the invention.

In the above description, the mobile phone terminal is employed for describing the embodiment of the invention; however, similar advantage can be realized in another mobile terminal apparatus such as a PHS, PDA, and DAP by changing an emission color of a light emitting element in response to the long time press of a key for helping key operation.

In the above description, every key backlight LED 301 emits light of color A at step S102 in FIG. 4; however, emission color may vary among the light emission elements as the light emission elements are independently controllable. If only an emission color of a key backlight LED corresponding to the pressed key is changed, the similar advantage can be realized. Not only causing every key back light LED 301 to emit, such configuration is possible that plural keys are arbitrarily selected in advance and key backlight LEDs 301 corresponding to the selected keys are caused to emit light. For example, only key backlight LEDs 301 corresponding to numeral keys may be caused to emit light.

In the above description, when the long-time press is determined in step S103 (Yes in step S103), the color change from color A to color B is executed. In this regard, when the color change to color B is conducted gradually until step S104 after the key back light LEDs 301 are caused to emit light of color A in step S102, the similar advantage can be achieved. As an example of gradual change of the emission color, when the emission color is changed from red to blue, such gradual change is available as "red→red-purple→purple→bluish-purple→blue."

In the above description, when the long-time press is determined in step S103 (Yes in step S103), the color change from color A to color B is executed; however, instead of the color change from color A to color B, light extinction provides the similar advantage.

In the above description, when the long-time press is determined in step S103 (yes in step S103), the color change from color A to color B is executed; however, the similar advantage can be realized when the emission color is fixed to color A but the brightness is raised.

In the above description, the long-time press of "#" key is described by way of example; however the embodiment can be applied to key operation of other key than "#" key.

In the above description, only a key backlight LED 301 corresponding to a pressed key is subjected to the color change; however, an emission color corresponding to a surrounding key such as a key on the left, right, up, or below of the pressed key can also be changed. Alternatively, emission color of key backlight LEDs 301 corresponding to keys other than the pressed key can be changed.

The emission color of the key backlight LED 301 corresponding to the pressed key and the emission color of all of the remaining key backlight LEDs 301 can be changed. In such a case, emission colors of all of the key backlight LEDs 301 are subjected to the color change.

In the above description, every key backlight LED 301 is independently RGB controllable; however, even in the case where merely some (or one) of the key backlight LEDs 301 are independently RGB controllable, when the embodiment is applied to those keys, the similar advantage can be achieved. That is, it is not necessarily required that the LED 301 of every key is set to be independently RGB controllable.

In the above description, the embodiment is applied to confirm acceptance of the long-time press; however, the color change can also be applied to the short-time press. In such a case, it can be embodied that the emission color of the key backlight LED corresponding to the pressed key is changed for a given period (for example, 500 msec) as well as executing the function assigned to the short-time press in step S107 in FIG. 4.

The terminal apparatus according to the embodiment can be implemented by hardware, software, or combination thereof. The terminal apparatus according to the embodiment can be implemented by a computer readable medium having stored thereon a program to be executed by a computer causing the computer to function as the terminal apparatus.

This application is the National Phase of PCT/JP2009/063219, filed Jul. 23, 2009, which is based upon and claims the benefit of priority from prior Japanese Patent Application No. 2008-207854, filed on Aug. 12, 2008. The contents of Japanese Patent Application No. 2008-207854 will be incorporated in the contents of description of this application. Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

{Industrial Applicability}

The present invention is preferably applicable to helping key input for a mobile terminal apparatus such as a mobile phone terminal, a PHS terminal, a PDA, and a DAP, provided with a key backlight which shines a key input unit.

{Reference Signs List}
  100: CPU
  110: bus
  120: input unit
  121: input key unit
  130: display controller
  131: display unit
  140: transmission/reception unit
  150: receiver
  160: backlight controller
  160-I: RGB controller
  161: liquid crystal backlight
  162: key backlight
  170: working memory
  180: nonvolatile memory
  190: ROM
  200: speaker
  210: microphone
  301: key backlight LED
  302: light
  1000: mobile phone

The invention claimed is:

1. A terminal apparatus comprising:
   input keys configured to detect pressing conducted thereon respectively;
   key backlights each of which emits a plurality of colors of light to shine corresponding one of the input keys; and a backlight controller configured to control the plurality of colors of light independently for each of the key backlights, wherein the backlight controller causes the key backlights to emit light of a first color in a case where an input key out of the input keys detects pressing thereon, and changes an emission color of a key backlight corresponding to the input key detecting the pressing from the first color to a second color when a state of the pressing becomes a predetermined state after the input key has been kept pressed without bring released for a predetermined time interval, and returns the emission color of the key backlight to the first color when the input key is released.

2. The terminal apparatus according to claim 1, wherein each of the key backlights is positioned under or near corresponding one of the input keys.

3. The terminal apparatus according to claim 1, wherein the predetermined state includes a state where a pressing period, for which the pressing on the input key is continuously detected, becomes a predetermined time period.

4. The terminal apparatus according to claim 1, wherein each of the key backlights includes three light emitting elements controllable by RGB control, and the backlight controller controls the key backlights under the RGB control.

5. The terminal apparatus according to claim 1, wherein the emission color is gradually changed when the emission color is changed from the first color to the second color.

6. A backlight emission method for a terminal apparatus comprising:
   input keys configured to detect pressing conducted thereon respectively;
   key backlights each of which emits a plurality of colors of light to shine corresponding one of the input keys; and
   a backlight controller configured to control the plurality of colors of light independently for each of the key backlights,
   the method comprising causing the key backlights to emit light of a first color in a case where an input key out of the input keys detects pressing thereon, and changing an emission color of a key backlight corresponding to the input key detecting the pressing from the first color to a second color when a state of the pressing becomes a predetermined state after the input key has been kept pressed without bring released for a predetermined time interval, and returning the emission color of the key backlight to the first color when the input key is released.

7. The backlight emission method according to claim 6, wherein each of the key backlights is positioned under or near corresponding one of the input keys.

8. The backlight emission method according to claim 6, wherein the predetermined state includes a state where a pressing period, for which the pressing on the input key is continuously detected, becomes a predetermined time period.

9. The backlight emission method according to claim 6, wherein each of the key backlights includes three light emitting elements controllable by RGB control, and the backlight controller controls the key backlights under the RGB control.

10. The backlight emission method according to claim 6, wherein the emission color is gradually changed when the emission color is changed from the first color to the second color.

11. A non-transitory computer readable medium having stored thereon a program which, when executed by a computer, causes a computer to function as a terminal apparatus, the terminal apparatus comprising:
   input keys configured to detect pressing conducted thereon respectively;
   key backlights each of which emits a plurality of colors of light to shine corresponding one of the input keys; and
   a backlight controller configured to control the plurality of colors of light independently for each of the key backlights,
   wherein the backlight controller causes the key backlights to emit light of a first color in a case where an input key out of the input keys detects pressing thereon, and changes an emission color of a key backlight corresponding to the input key detecting the pressing from the first color to a second color when a state of the pressing becomes a predetermined state after the input key has been kept pressed without bring released for a predetermined time interval, and returns the emission color of the key backlight to the first color when the input key is released.

12. The computer readable medium according to claim 11, wherein each of the key backlights is positioned under or near corresponding one of the input keys.

13. The computer readable medium according to claim 11, wherein the predetermined state includes a state where a pressing period, for which the pressing on the input key is continuously detected, becomes a predetermined time period.

14. The computer readable medium according to claim 11, wherein each of the key backlights includes three light emitting elements controllable by RGB control, and the backlight controller controls the key backlights under the RGB control.

15. The computer readable medium according to claim 11, wherein the emission color is gradually changed when the emission color is changed from the first color to the second color.

* * * * *